US006648338B1

(12) United States Patent
Jaeger et al.

(10) Patent No.: US 6,648,338 B1
(45) Date of Patent: Nov. 18, 2003

(54) EXHAUST GASKET WITH INDIVIDUALLY SEALED WATER PASSAGES

(75) Inventors: Matthew W. Jaeger, Stillwater, OK (US); Andrew K. Logan, Stillwater, OK (US); Christopher J. Luckett, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/098,272

(22) Filed: Mar. 15, 2002

(51) Int. Cl.[7] ............................................... F02F 11/00
(52) U.S. Cl. ...................................................... 277/591
(58) Field of Search ................................ 277/591–598, 277/628

(56) References Cited

U.S. PATENT DOCUMENTS

| | | | | |
|---|---|---|---|---|
| 1,866,829 A | * | 7/1932 | Welling ...................... 48/189.4 |
| 4,056,682 A | * | 11/1977 | Havens et al. ......... 174/35 GC |
| 4,272,085 A | * | 6/1981 | Fujikawa et al. ............ 277/594 |
| 4,434,989 A | * | 3/1984 | Beyer et al. ................. 277/592 |
| 4,526,002 A | | 7/1985 | Bibow .......................... 60/293 |
| 4,866,934 A | | 9/1989 | Lindstedt ...................... 60/321 |
| 4,991,546 A | | 2/1991 | Yoshimura .................... 123/41 |
| 5,109,668 A | | 5/1992 | Lindstedt ...................... 60/310 |
| 5,133,185 A | | 7/1992 | Gilbreath et al. .............. 60/309 |
| 5,205,569 A | * | 4/1993 | Udagawa et al. ............ 277/594 |
| 5,330,200 A | * | 7/1994 | Unseth ......................... 277/592 |
| 5,671,927 A | * | 9/1997 | Schweiger .................. 277/630 |
| 5,951,021 A | * | 9/1999 | Ueta ............................ 277/593 |
| 6,022,254 A | | 2/2000 | Neisen ......................... 440/89 |
| 6,077,137 A | | 6/2000 | Hahn .......................... 440/89 |
| 6,113,109 A | * | 9/2000 | Lieb et al. ................... 277/590 |
| 6,231,053 B1 | * | 5/2001 | Wakamatsu ................. 277/628 |
| 6,290,558 B1 | | 9/2001 | Erickson ...................... 440/89 |
| 6,371,489 B1 | * | 4/2002 | Combet et al. ............. 277/594 |
| 6,502,830 B2 | * | 1/2003 | Teranishi et al. ........... 277/594 |
| 2002/0084595 A1 | * | 7/2002 | Forry .......................... 277/592 |

* cited by examiner

Primary Examiner—Anthony Knight
Assistant Examiner—Vishal Patel
(74) Attorney, Agent, or Firm—William D. Lanyi

(57) ABSTRACT

A gasket for an exhaust system comprises a metallic plate having an exhaust sealing segment and a coolant sealing segment which is attached to and extends from the exhaust sealing segment. Both segments have first and second planar surfaces on opposite sides thereof, with the first and second planar surfaces of the exhaust sealing segment being co-planar with the first and second planar surfaces of the coolant sealing segment, respectively. An exhaust opening is formed through the plate and first and second elastomeric seals, which can be silicone rubber and which are both integral parts of a common elastomeric element, are disposed on the first and second surfaces, respectively, of the coolant sealing segment. A raised portion of the exhaust opening through the metal plate extends at an angle from the exhaust sealing segment and away from the first surface to form a transition segment from a first opening to a second. A hole can be formed through the plate and located at a central region of the coolant sealing segment with the common elastomeric element extending through the hole with the first and second elastomeric seals being joined to each other within the hole. A central portion of the coolant sealing segments can either comprise a hole to allow liquid to flow through the thickness of the plate, or alternatively, can comprise a solid portion that inhibits a flow of liquid through the thickness of the plate.

19 Claims, 6 Drawing Sheets

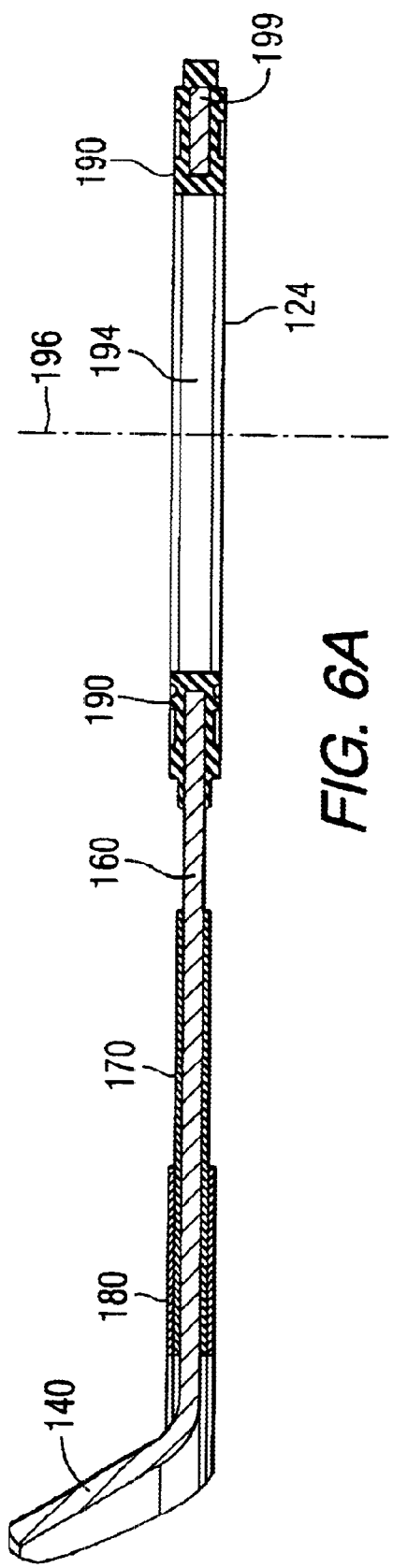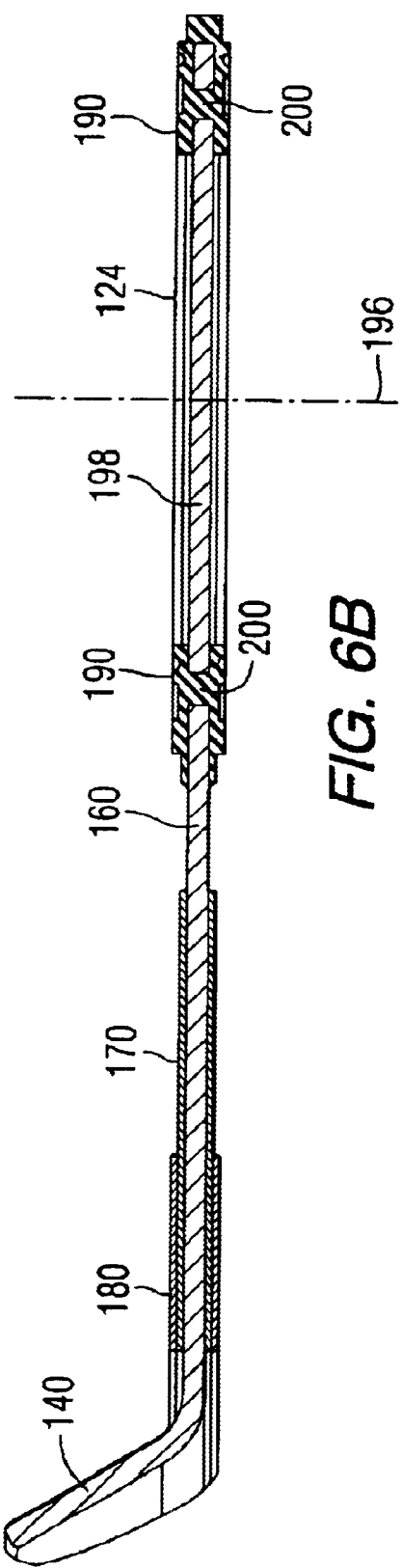

EXHAUST GASKET WITH INDIVIDUALLY SEALED WATER PASSAGES

BACKGROUND OF THE INVENTION

1. Field of the Invention

The present invention is generally related to an exhaust system for a marine propulsion system and, more particularly, to a gasket for an exhaust manifold and an exhaust elbow which are configured to separate the exhaust gas interface between the manifold and elbow from the coolant interface between those components in order to provide an elevated temperature at the interface and to decrease potential deleterious effects that could otherwise result from a coolant leak at the interface.

2. Description of the Prior Art

Marine propulsion systems are well known to those skilled in the art. In addition, exhaust systems for marine propulsion engines are also well known.

U.S. Pat. No. 4,866,934, which issued to Lindstedt on Sep. 19, 1989, discloses a marine drive exhaust system with shaped O-ring seals. The exhaust system is provided with resilient, shaped rubber O-ring seals between facing surfaces of the exhaust manifold and exhaust elbow and the facing surfaces of the exhaust elbow and the exhaust pipe. Each of the shaped O-ring seals has an inner peripheral rib extending peripherally around the exhaust passage and generally conforming to the shape thereof and begin spaced laterally between the exhaust passage and the peripheral water passages. Each of the shaped O-ring seals has an outer peripheral rib extending peripherally around the water passages and spaced laterally outward of the inner rib by a gap through which the water passages extend.

U.S. Pat. No. 6,290,558, which issued to Erickson on Sep. 18, 2001, discloses an exhaust elbow with a water trap for a marine propulsion system. The elbow for a marine propulsion exhaust system is provided with a water trap section that defines a water collection cavity. Within the water trap section, a barrier extends downward into the water collection cavity to define first and second exhaust passages. When water begins to collect in the water collection cavity, the cross sectional area of the exhaust passage is reduced and the velocity of exhaust gases passing through the exhaust passage is increased. The water collection cavity is shaped to be easily cleared when exhaust gas pressure increases as the engine speed increases.

U.S. Pat. No. 6,077,137, which issued to Hahn on Jun. 20, 2000, describes an anti ingestion device. The device is intended for use with an engine, preferably a marine engine. The device comprises an exhaust manifold or riser system for exhausting engine gases, wherein the exhaust manifold has a first end and a second end, and the first end is connected to a cylinder head. There is a one-way pressure relief valve having a first end and a second end, wherein the first end is coupled to the exhaust manifold and the second end is exposed to atmospheric pressure. An air inlet line is coupled to the second end of the one-way pressure relief valve, such that the air inlet line serves as a conduit for guiding atmospheric pressure to the one-way pressure relief valve, thereby providing atmospheric pressure for passage into the exhaust manifold.

U.S. Pat. No. 5,133,185, which issued to Gilbreath et al on Jul. 28, 1992, describes an anti-moisture device for an engine exhaust. The device for removing moisture droplets from an interior surface of a duct, characterized by an outer edge secured to the interior surface of the duct, an inner edge surrounding an opening, and a connecting wall between the outer and inner edges is described. The inner edge of the anti-moisture device is positioned closer to a downstream end of the duct than the outer edge whereby the connecting wall is positioned at an angle relative to the interior surface of the duct. Moisture droplets traveling upstream will be caught between the connecting wall and the interior surface of the duct, on the downstream side of the device. The connecting wall is dimensioned so that a turbulent disturbance will be created along the interior surface of the duct whereby moisture droplets will be removed. The anti-moisture device is preferably made of a thermally conductive material so that moisture droplets contacting the device will be flashed into steam, or vaporized.

U.S. Pat. No. 4,526,002, which issued to Bibow on Jul. 2, 1985, discloses an exhaust relief system. The engine of a stern drive is provided with a vacuum relief valve to relieve any vacuum which may occur in the exhaust manifold, thus preventing water from entering the engine through the exhaust system. The relief valve is connected to allow one-way flow from the intake manifold to the exhaust system, thus providing an essentially closed system.

U.S. Pat. No. 4,991,546, which issued to Yoshimura on Feb. 12, 1991, describes a cooling device for a boat engine. A number of embodiments of cooling systems for internal combustion engines powering marine watercraft, wherein the engine cooling jacket delivers its coolant to an exhaust manifold cooling jacket adjacent the inlet end of the exhaust manifold and wherein coolant is delivered from the exhaust manifold cooling jacket to a further cooling jacket around the inlet portion of an exhaust elbow is described. In one embodiment, a closed cooling system is provided for the engine cooling jacket, exhaust manifold cooling jacket, and the elbow cooling jacket. In another embodiment, the system discharges coolant back to the body of water in which the watercraft is operating through a further cooling jacket of the exhaust elbow that communicates with its discharge end.

U.S. Pat. No. 5,109,668, which issued to Lindstedt on May 5, 1992, discloses a marine exhaust manifold and elbow. The marine exhaust assembly includes a manifold portion, an elbow portion, a water jacket portion, and exhaust runner walls, providing a smooth continuous transition of exhaust gas flow from intake exhaust passages in the manifold portion to transfer exhaust passages in the elbow portion around a bend to a discharge exhaust passage minimizing turbulent flow of exhaust through the manifold portion and elbow portion. Each transfer exhaust passage has its own water supply inlet at the upstream end of the respective intake exhaust passage. An upper vent includes a steam outlet opening in the water jacket at the high point of the elbow portion, and a steam exhaust channel extending along the top exterior of the water jacket portion in a raised bead above and parallel to an upper water flow passage and directing steam to the end of the discharge exhaust passage to mix with water and exhaust thereat. Water supports assist in directing cooling water up through the water jacket to the top of the elbow bend, and also prevent wall collapse during lost foam stainless steel casting.

U.S. Pat. No. 6,022,254, which issued to Neisen on Feb. 8, 2000, discloses an exhaust system for an inboard/outboard marine propulsion system. The exhaust system includes intermediate exhaust pipes which are physically separate components than the water separator. A sealed latching mechanism connects an outlet portion of the intermediate exhaust pipes to an inlet portion of the water separator. The sealed latching mechanism is secured yet flexible, and allows the orientation of the intermediate exhaust pipe to be adjusted relative to the water separator, thus allowing the exhaust system to be installed and serviced without dismounting or loosening the engine. The intermediate exhaust pipes also have a flared inlet part to facilitate alignment of the intermediate exhaust pipe at the exhaust elbow.

The patents described above are hereby expressly incorporated by reference in the description of the present invention.

One potential problem that can occur in an exhaust system of a marine propulsion system is the reverse flow of water within the exhaust conduits, in a direction from the body of water in which the marine vessel is operated back toward the exhaust manifold of the engine, resulting from negative pressure pulses within the exhaust conduit. These negative pressure pulses can draw water in a reverse direction through the exhaust conduit toward the cylinders of the engine. Many different systems, including those described in U.S. Pat. Nos. 6,290,558 and 6,077,137, have been developed as modifications to the exhaust elbow structure to address this problem. In addition, an added device, such as that described in U.S. Pat. No. 5,133,185, has been developed for insertion between the exhaust manifold and the exhaust elbow in order to inhibit water from being drawn through the exhaust conduit in a reverse direction.

Exhaust systems for marine propulsion systems also experience a problem relating to the potential leakage of cooling water through the gasket between the exhaust elbow and the exhaust manifold. When this occurs in known exhaust systems, the water can flow from the coolant conduit of the exhaust manifold and exhaust elbow to the exhaust conduit of these components. The leakage of water through a failed gasket in this manner can allow water to leak into the exhaust manifold and, eventually, into the cylinders of the engine.

Both of these problems, described immediately above, relate to the passage of water into the cylinders of the engine. The water can cause serious damage if it is allowed to flow into the cylinders through open exhaust valves. The water can migrate to the region of the exhaust valves either by water inversion from the body of water in which the vessel is operated, in a reverse direction through the exhaust conduit, or alternatively, into the exhaust manifold from the water coolant system through a failed gasket between the exhaust manifold and the exhaust elbow.

It would be significantly beneficial if both of these water related problems could be solved. It would also be significantly beneficial if the exhaust passage from the exhaust manifold to the exhaust elbow were maintained at an elevated temperature in order to assist anti-moisture devices, such as that described in U.S. Pat. No. 5,133,185, to operate more efficiently.

SUMMARY OF THE INVENTION

An exhaust system for a marine propulsion engine, made in accordance with a preferred embodiment of the present invention, comprises an exhaust manifold which has an internal exhaust cavity formed within it and connectable in fluid communication with a plurality of cylinders of the engine for conducting exhaust gases away from the cylinders. It further comprises an internal coolant cavity, formed within the exhaust manifold, which is connectable in fluid communication with a coolant conduit of the engine for conducting coolant away from the coolant conduit of the engine. A first surface is formed on the exhaust manifold and the internal exhaust cavity intersects the first surface to form a first opening through which exhaust gases can flow out of the internal exhaust cavity of the exhaust manifold. A second surface is formed on the exhaust manifold and the internal coolant cavity intersects the second surface to form a second opening through which coolant can flow out of the internal coolant cavity of the exhaust manifold. The first and second surfaces are noncontiguous with each other.

In a particularly preferred embodiment of the present invention, the first and second surfaces are flat and disposed in a common plane. The present invention further comprises a first raised portion of the exhaust manifold. The first surface is disposed on the first raised portion. It further comprises a second raised portion on which the second surface is disposed. The first and second raised portions are spaced apart from each other to separate the first and second surfaces from each other.

A preferred embodiment of the present invention further comprises an exhaust elbow and an internal exhaust passage formed within the exhaust elbow which is connectable in fluid communication with the exhaust cavity of the exhaust manifold for conducting the exhaust gases away from the exhaust manifold. It also comprises an internal coolant passage formed within the exhaust elbow which is connectable in fluid communication with the internal coolant cavity of the exhaust manifold for conducting the coolant away from the internal coolant cavity of the exhaust manifold. A third surface is formed on the exhaust elbow and the internal exhaust passage intersects the third surface to form a third opening through which exhaust gases can flow out of the internal exhaust passage of the exhaust elbow. A fourth surface is formed on the exhaust elbow and the internal coolant passage intersects the fourth surface to form a fourth opening through coolant can flow out of the internal coolant passage of the exhaust elbow. The third and fourth surfaces are noncontiguous with each other. The third and fourth surfaces are flat, in a particularly preferred embodiment of the present invention, and are disposed in a common plane.

Third and fourth raised portions of the exhaust manifold are provided with the third and fourth surfaces being disposed on them, respectively. The third and fourth raised portions are spaced apart from each other to separate the third and fourth surfaces from each other. The first surface of the exhaust manifold is disposed in a posed facing relation with the third surface of the exhaust elbow and the second surface of the exhaust manifold is disposed in the posed facing relation with the fourth surface of the exhaust manifold. The exhaust elbow is rigidly attachable to the exhaust manifold.

A gasket is disposed between the first and third surfaces and between the second and fourth surfaces. In a preferred embodiment, the first, second, third and fourth surfaces are flat machine surfaces.

The gasket for an exhaust system, made in accordance with the present invention, comprises a metallic plate having an exhaust sealing segment and a coolant sealing segment. The coolant sealing segment is attached to and extends from the exhaust sealing segment. The exhaust sealing segment and the coolant sealing segment of the gasket each have first and second planar surfaces on opposite sides thereof. The first and second planar surfaces of the exhaust sealing segment are co-planar with the first and second planar surfaces of the coolant sealing segment, respectively. An exhaust opening is formed through the thickness of the exhaust sealing segment of the plate and first and second elastomeric seals are disposed on the first and second surfaces, respectively, of the coolant sealing segment. The first and second elastomeric seals are integral parts of a common elastomeric element. A raised portion of the exhaust opening through the metal plate extends at an angle from the exhaust sealing segment and away from the first surface to form a transition segment from a first opening of a first size, which is co-planar with the first surface, to a second opening of a second size, which is displaced from the first surface. The second opening is smaller in area than the first opening and, in a preferred embodiment, the transition segment is the shape of a frustum of a pyramid. A hole can be formed through the plate and located at a central region of the coolant sealing segment. The common elastomeric element can extend through the hole with the first and second elastomeric seals being joined to each other within the hole. The hole can be circular or, alternatively, a hole can be formed in the shape of an arc to serve the limited purpose of joining the first and second elastomeric seals together. A central portion of the coolant sealing segments can either comprise a hole to allow liquid to flow through the thickness of the plate, or alternatively, can comprise a solid portion that inhibits a flow of liquid through the thickness of the plate. The elastomeric element can be silicone rubber and the plate can be made of stainless steel. First and second graphite layers can be attached to the first and second surfaces of the plate.

BRIEF DESCRIPTION OF THE DRAWINGS

The present invention will be more fully and completely understood from a reading of the description of the preferred embodiment in conjunction with the drawings, in which:

FIGS. 6A and 6B show section views of the gasket made in accordance with two alternative embodiments of the present invention.

DESCRIPTION OF THE PREFERRED EMBODIMENT

Figure 1:
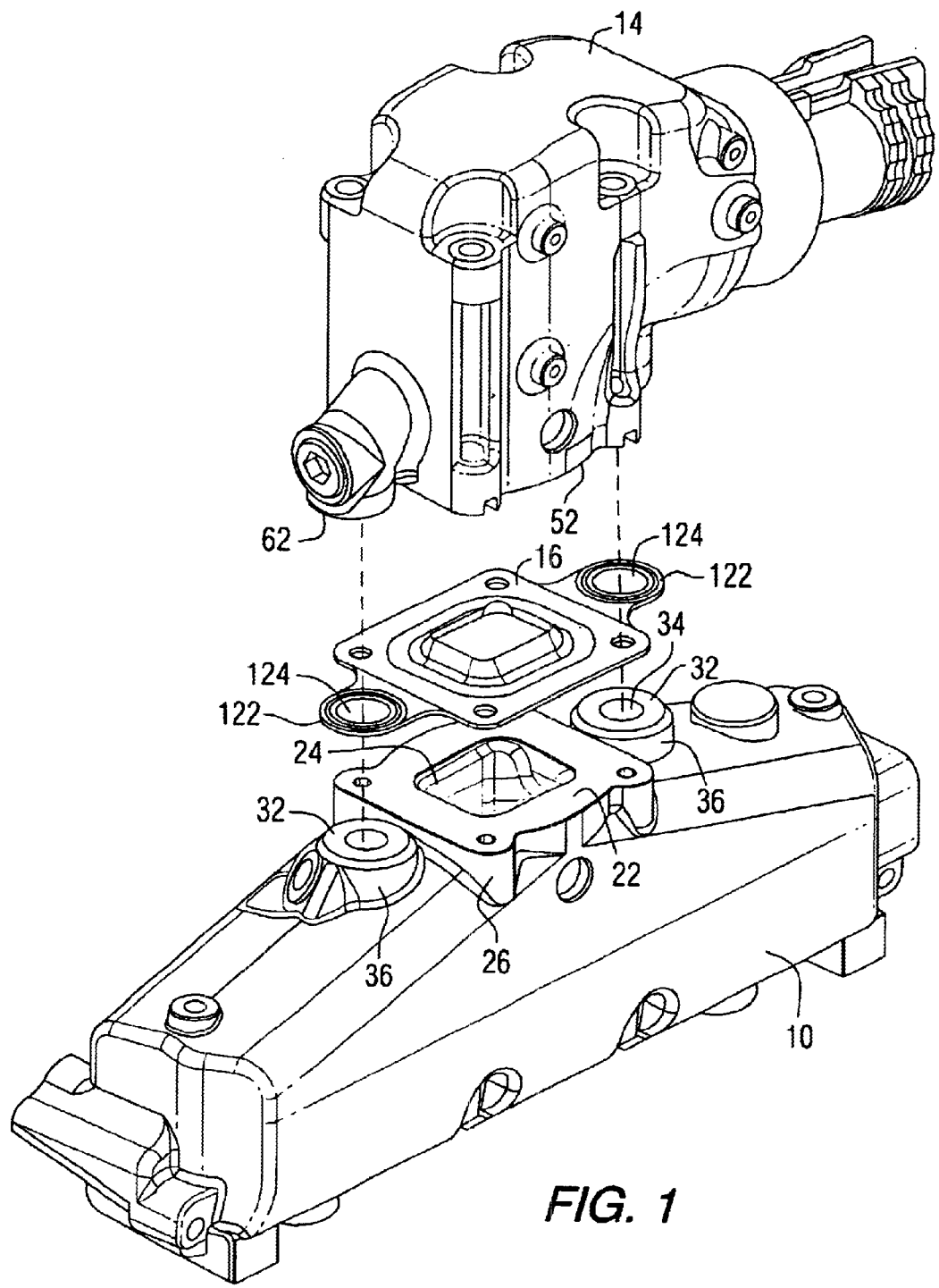
FIG. 1 is an isometric exploded view of an exhaust system made in accordance with the present invention.

Throughout the description of the preferred embodiment of the present invention, like components will be identified by like reference numerals.

Figure 2:
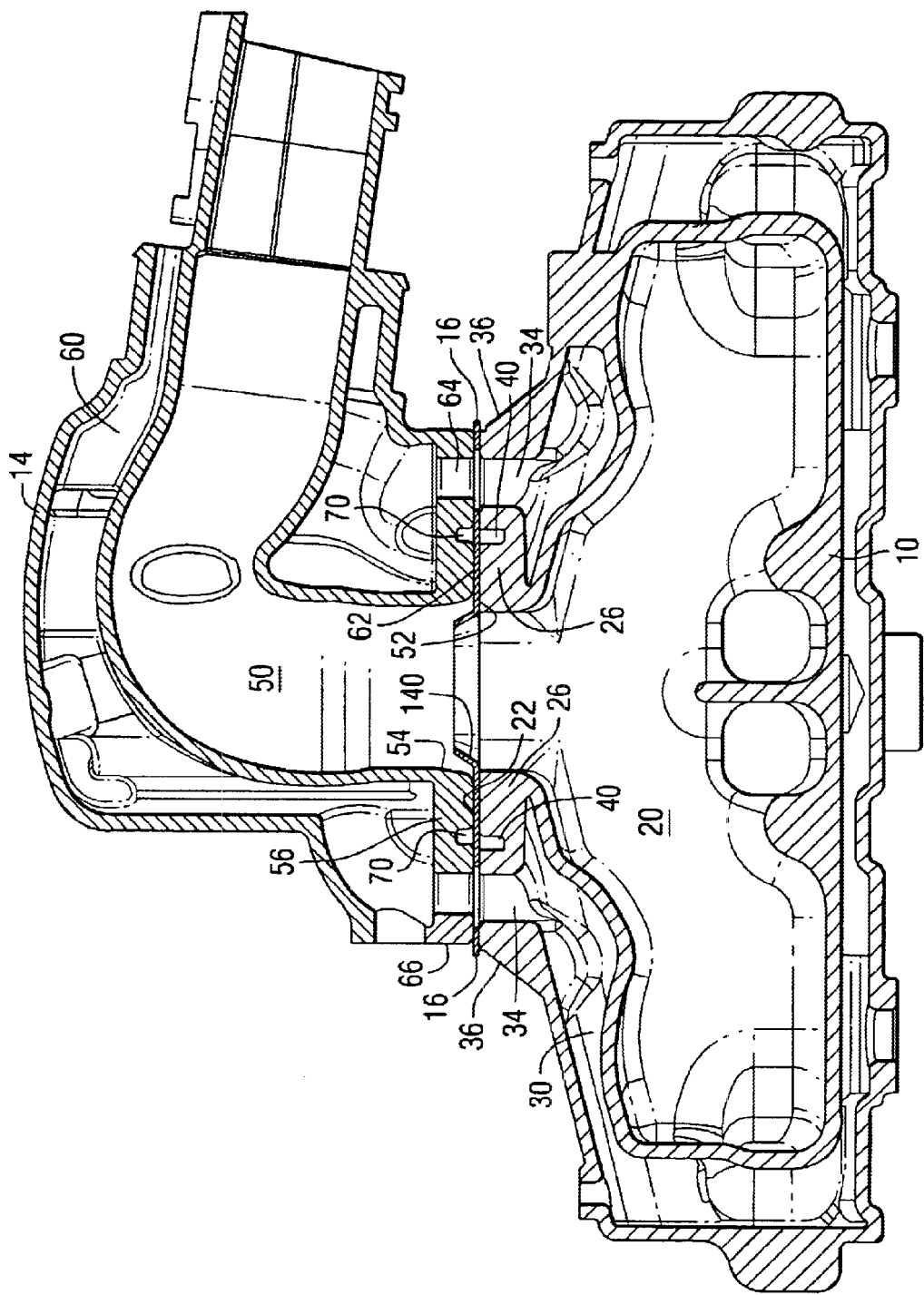
FIG. 2 is a section view of an exhaust system made in accordance with the present invention.

FIG. 1 is an exploded isometric view of an exhaust system comprising an exhaust manifold 10, an exhaust elbow 14, and a gasket 16 disposed between them. FIG. 2 is a section view of an assembled exhaust system, like the system shown in FIG. 1 in section view. With reference to FIGS. 1 and 2, the exhaust manifold 10 is provided with an internal exhaust cavity 20 and an internal coolant cavity 30. A first surface 22 is formed on the exhaust manifold 10 and the internal exhaust cavity 20 intersects the first surface 22 to form a first opening 24 through which exhaust gases can flow out of the internal exhaust cavity 20 of the exhaust manifold 10. A second surface 32 is formed on the exhaust manifold 10 and the internal coolant cavity 30 intersects the second surface 32 to form a second opening 34 through which coolant can flow out of the internal coolant cavity 30 of the exhaust manifold 10.

As shown in FIGS. 1 and 2, the first and second surfaces, 22 and 32, are noncontiguous with each other. In other words, a space 40 is provided between the first and second surfaces, 22 and 32. This space 40 is most clearly visible in FIG. 2, but it should be understood that the isometric view in FIG. 4 also shows this space separating the first surface 22 from the second surface 32. It should also be understood that two occurrences of the second surface 32 are illustrated in FIGS. 1 and 2, but both of those occurrences are functionally identical to each other and both of those second surfaces 32 have the same spatial relationship to the first surface 22. Therefore, the present invention will be described in terms of a single second surface 32 although it should be understood that this singularity is not limiting to the present invention.

With continued reference to FIGS. 1 and 2, it can be seen that the first and second surfaces, 22 and 32, are generally flat and are disposed in a common plane. The present invention further comprises a first raised portion 26 of the exhaust manifold 10. The first surface 22 is disposed on the first raised portion 26. A second raised portion 36 is provided and the second surface 32 is disposed on the second raised portion 36. The first and second raised portions, 26 and 36, are spaced apart from each other, by space 40, to separate the first and second surfaces, 22 and 32, from each other.

With continued reference to FIGS. 1 and 2, the present invention further comprises an exhaust elbow 14 which is provided with an internal exhaust passage 50 and an internal coolant passage 60. The internal exhaust passage is formed within the exhaust elbow 14 and is connectable in fluid communication with the internal exhaust passage 20 of the exhaust manifold 10 for conducting the exhaust gases away from the exhaust manifold. An internal coolant passage 60 is formed within the exhaust elbow 14 and is connectable in fluid communication with the internal coolant cavity 30 of the exhaust manifold 10 for conducting coolant away from the internal coolant cavity 30 of the exhaust manifold.

A third surface 52 is formed on the exhaust elbow 14. The internal exhaust passage 50 intersects the third surface 52 to form a third opening 54 through which exhaust gases can flow into the internal exhaust passage 50 of the exhaust elbow 14. A fourth surface 62 is formed on the exhaust elbow 14. The internal coolant passage 60 intersects the fourth surface 62 to form a fourth opening 64 through which coolant can flow into the internal coolant passage 60 of the exhaust elbow 14. The third and fourth surfaces, 52 and 62, are noncontiguous with each other and are separated from each other by the space identified by reference numeral 70 in FIG. 2.

The third and fourth surfaces, 52 and 62, are generally flat and disposed in a common plane in a preferred embodiment of the present invention. A third raised portion, 56 of the exhaust elbow is provided and a third surface 52 is disposed on the third raised portion 56. A fourth raised portion 66 of the exhaust elbow has the fourth surface 62 disposed on it. The third and fourth raised portions are spaced apart from each other, by space 70, in order to separate the third and fourth surfaces from each other.

The first surface 22 of the exhaust manifold 10 is disposed in opposed facing relation with the third surface 52 of the exhaust elbow 14. The second surface 32 of the exhaust manifold 10 is disposed in opposed facing relation with the fourth surface 62 of the exhaust elbow 14. In this manner, the exhaust elbow 14 is rigidly attached to the exhaust manifold 10. A gasket 16 is disposed between the first and third surfaces, 22 and 52, and between the second and fourth surfaces, 32 and 62. In a preferred embodiment, the first, second, third, and fourth surfaces are flat machined surfaces.

The gasket 16 is particularly configured to seal both the exhaust passage and the coolant passages between the exhaust manifold 10 and the exhaust elbow 14. As will be described in greater detail below, the configuration of the gasket 16 is particularly designed and adapted for use for coolant passages, such as the second openings 34, that are thermally separated from the exhaust passage, such as the first opening 24. In addition, the gasket is provided with a raised portion 140 as identified in FIG. 2.

Figure 3:
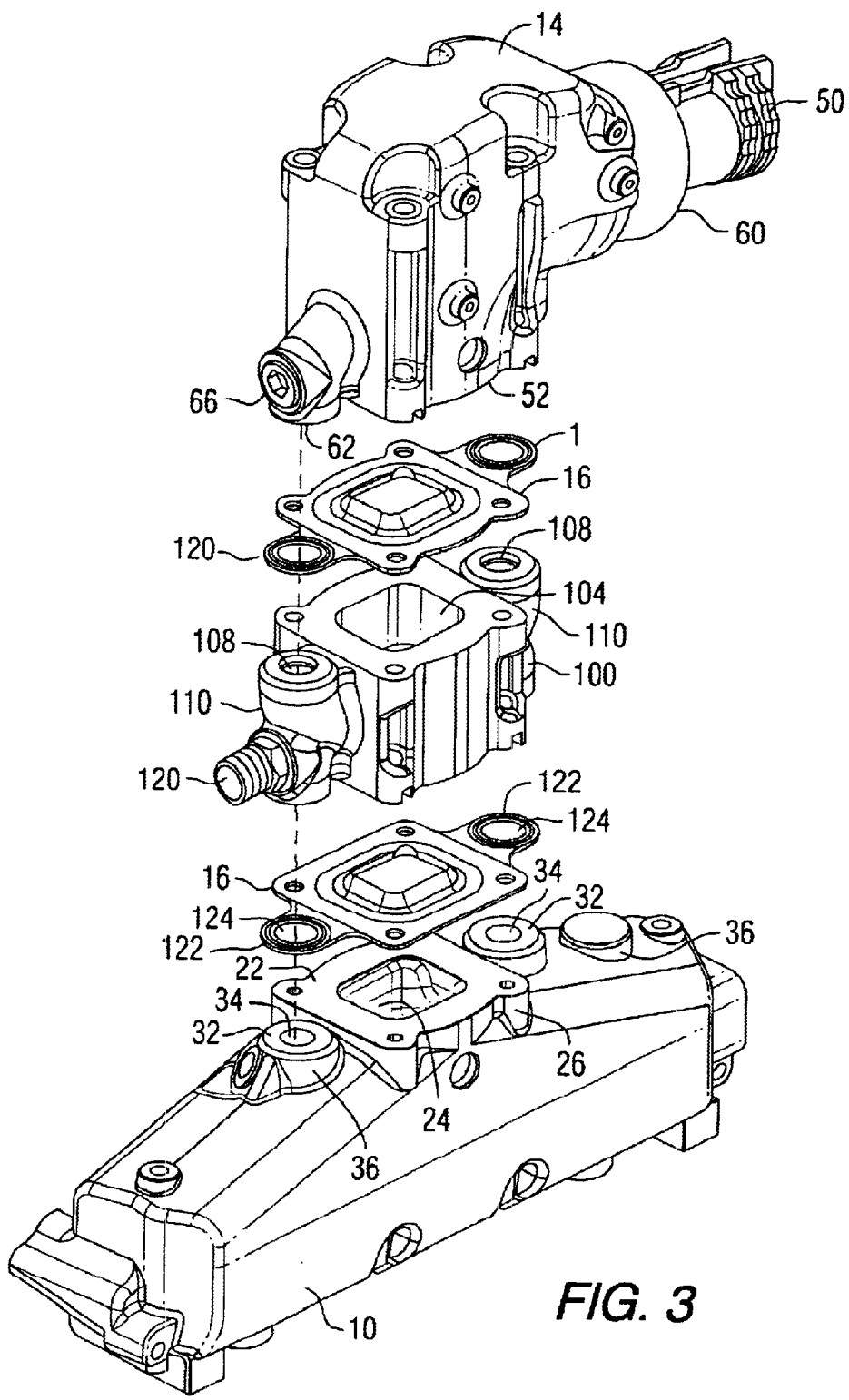
FIG. 3 is generally similar to FIG. 1, but with an additional intermediate body used to change the distance between the exhaust manifold and the exhaust elbow.

FIG. 3 illustrates an isometric exploded view of a spatial modification of the present invention in which an intermediate member 100 is connected between the exhaust manifold 10 and the exhaust elbow 14. The primary purpose of the intermediate member 100 is to elevate the exhaust elbow 14 relative to the exhaust manifold 10 so that the overall configuration is more adaptable to certain applications in specific types of marine vessels. The intermediate member 100 also serves a valuable purpose of conducting the exhaust gases through its central exhaust conduit 104. It also can conduct coolant through coolant passages 108 formed through the fluid conducting members 110 supported by the intermediate member 100. The top and bottom surfaces of the intermediate member 100 are shaped to be associated with the surfaces, 52 and 62, of the exhaust elbow 14 and the surfaces, 22 and 32, of the exhaust manifold 10. When the intermediate member 100 is used to raise the exhaust elbow 14 upward relative to the exhaust manifold 10, conduit 120 can serve two alternative purposes. First, it can be blocked and sea or lake water can be allowed to flow upward from the second openings 34 through the fluid conducting members 110 and into the fourth openings 64 of the exhaust elbow 14. A second alternative function of the conduits 110 can be performed if the second openings 34 are blocked, intentionally, by the extensions 122 of gasket 16 which is disposed between the exhaust manifold 10 and the intermediate member 100. In these cases, sea or lake water can be introduced directly into opening 120 to flow upward through the fluid conducting member 110 and into the fourth opening 64 formed through the fourth opening 64 in the raised portion 66 of the exhaust elbow 14. As will be described in greater detail below, the central portion 124 of the extensions 122 of the gasket 16 can be provided with openings formed through the thickness of the gasket 16 to allow coolant to flow upward through the gasket extensions 122 or, alternatively, the central portions 124 of the extensions 122 can be made impervious to liquid flow therethrough. When the central portions 124 are impervious to liquid flow, the second openings 34 are effectively blocked and coolant can not flow upward from the exhaust manifold 10 into the exhaust elbow 14. In embodiments of the present invention of this type, sea or lake water is caused to flow into conduit 120 and upward through coolant passages 108 so that the liquid coolant can continue flowing into the fourth openings 64 and through the exhaust elbow 14. These alternatives will be described in greater detail below in conjunction with a more detailed description of the gasket 16 and its alternative functions. It should be understood that the exhaust manifolds, exhaust elbows, and intermediate members are typically attached together through the use of long hex-head screws which are not shown in the figures.

Figure 4B:
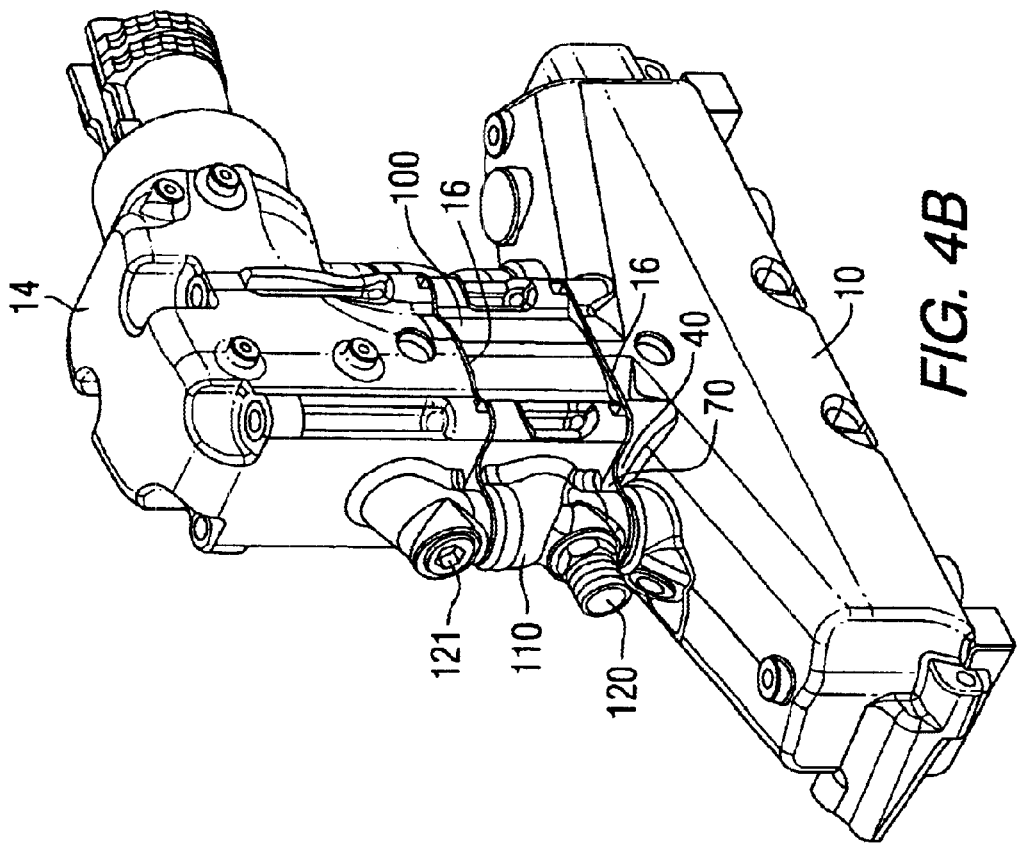
FIGS. 4A and 4B show the starboard and port exhaust systems of a marine vessel, respectively.
Figure 4A:
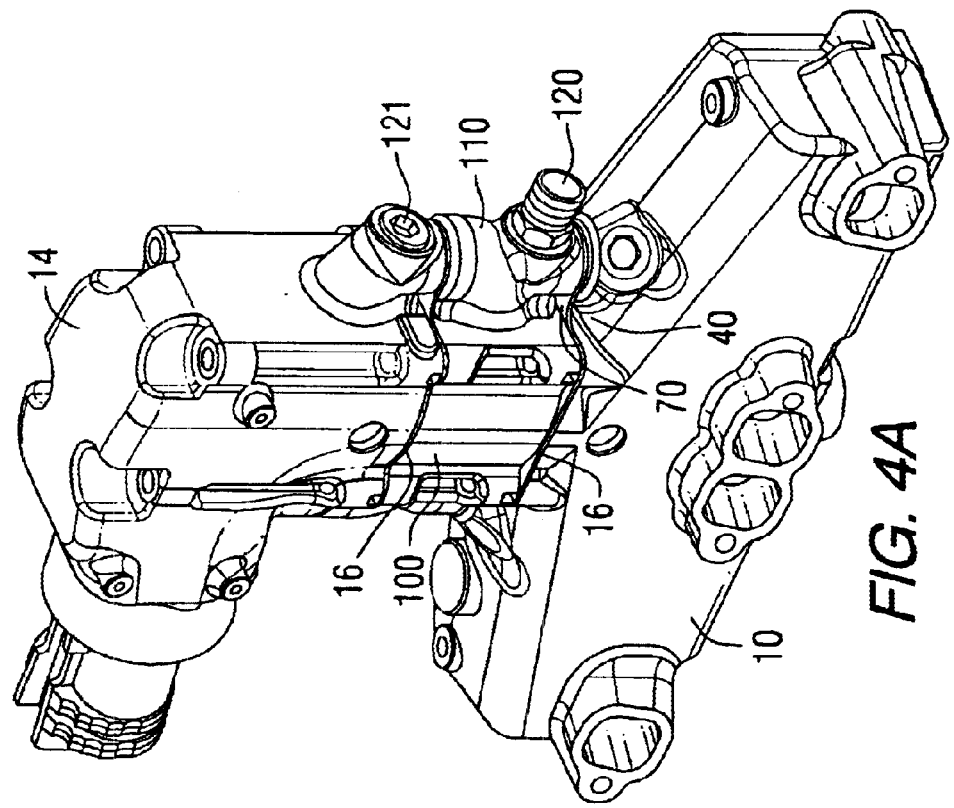

FIGS. 4A and 4B show assembled views of starboard and port exhaust systems, respectively, for a marine propulsion system. The examples shown in FIGS. 4A and 4B incorporate the intermediate member 100, but it should be understood that the intermediate member 100 is only included as part of the exhaust system in applications in which it is desirable to raise the exhaust elbow 14 upward relative to the exhaust manifold 10. It should be clearly understood that the intermediate member 100 is used for spatial purposes and does not alter the basic functions of the present invention. In certain systems, two cooling liquids are used. Sea or lake water is used to remove heat from a coolant, such as ethylene glycol, which is used to remove heat from the heat producing components of the engine. This is referred to as a closed cooling system. If the intermediate member 100 is not used, and a closed cooling system is used, the second openings 34 would be blocked by the central portions 124 of the gasket 16 and sea or lake water would be introduced into conduit 120. With reference to FIGS. 2, 3, 4A, and 4B, exhaust gases flow upward through the internal exhaust cavity 20 of the exhaust manifold 10, through the first opening 24, into the third opening 54 of the exhaust elbow 14, and through the internal exhaust passage 50 of the exhaust elbow 14. Coolant, which can be sea or lake water, flows through the internal coolant cavity 30 of the exhaust manifold 10, through the second opening 34, through the fourth opening 64, and into the internal coolant passage 60 of the exhaust elbow 14. It is important to note that a gap, which comprises spaces 40 and 70, exists between the raised portions, 36 and 66, associated with the coolant passages and the raised portions, 26 and 56, associated with the exhaust passage. This isolation between the coolant passages and exhaust passages in the region of the gasket 16, elevates the operating temperature of the first and third raised portions, 26 and 56, relative to the second and fourth raised portions, 36 and 66. The increased temperature surrounding the first and third raised portions causes the temperature of the exhaust joint to be higher than the temperature of the coolant joints. This also raises the temperature of the gasket 16. The gasket 16 is intended to perform the function described in U.S. Pat. No. 5,133,185, discussed above. The vaporization of water that moves into contact with the gasket 16 is enhanced by the increased temperature of the exhaust joint.

Figure 5A:
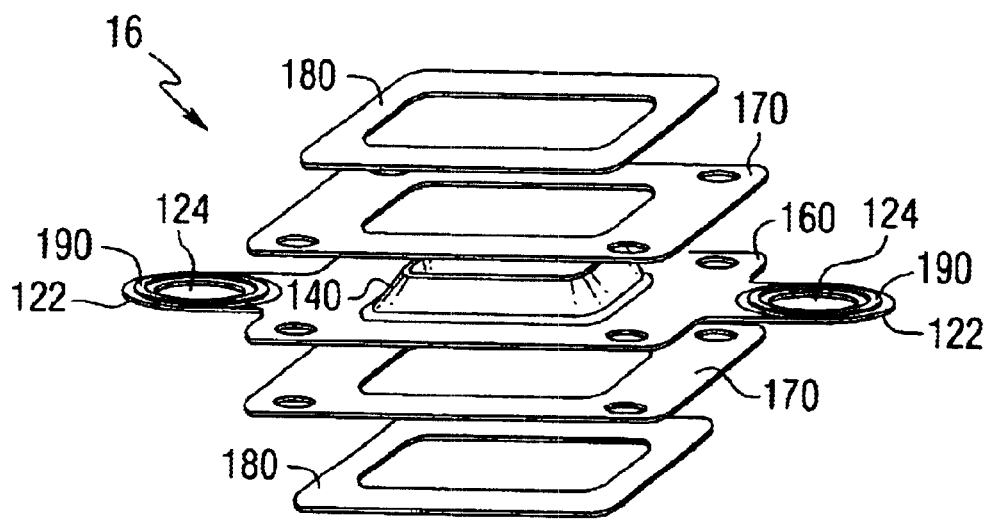
FIGS. 5A and 5B show an isometric exploded view and an isometric view of a gasket made in accordance with the present invention.

FIG. 5A is an exploded view of a gasket 16 used in a preferred embodiment of the present invention. The functions of the gasket 16 comprise the basic function of the anti-moisture device disclosed in U.S. Pat. No. 5,133,185 and described above in addition to other functions. With reference to FIGS. 2 and 5A, water flowing in a reverse direction through the exhaust elbow 14, as a result of exhaust pressure pulses or condensation, back toward the exhaust manifold 10 moves in a direction generally from right to left in FIG. 2 and then downward through opening 54 into the internal exhaust cavity 20. This water travels along the internal walls of the internal exhaust passage 50. The raised portion 140 of the gasket 16 forms an acute angle with the internal wall of the internal exhaust passage 50 to trap water between the raised portion 140 of the gasket 16 and the internal wall near opening 54 of the exhaust elbow 14. The water is then expected to flash, or rapidly evaporate, when it moves into contact with the raised portion 140. By increasing the temperature of the gasket 16, this rapid evaporation is significantly enhanced. If the cooling passages, in the regions of the second opening 34 and the fourth opening 64, were closer together as in known exhaust systems, the temperature of the exhaust joint near the raised portion 140 of the gasket 16 would be lower as a result of the cooling effect of the more closer proximate cooling liquid near the joint. A preferred construction of the gasket 16 is shown in the exploded view of FIG. 5A.

Figure 5B:
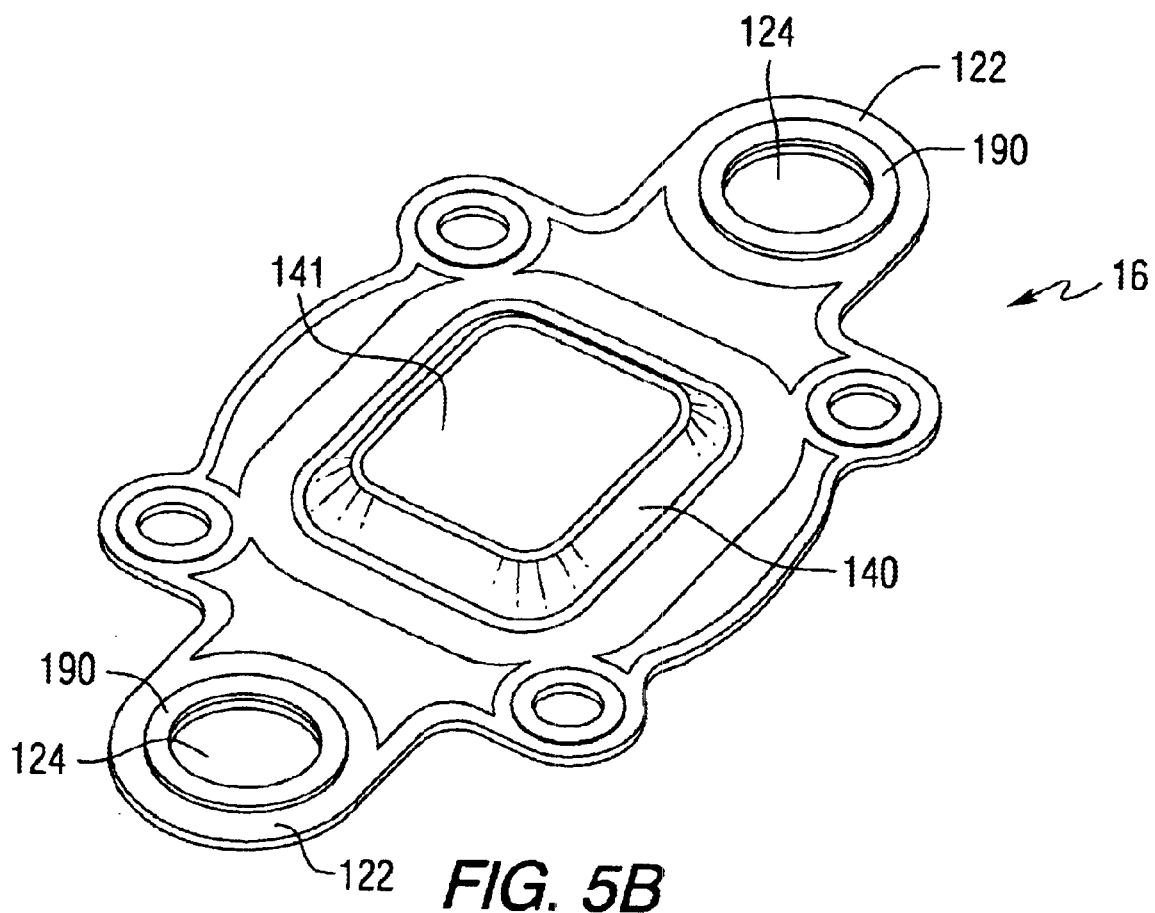

A gasket made in accordance with the preferred embodiment of the present invention comprises a stainless steel plate 160 having an exhaust sealing segment and a coolant sealing segment attached to and extending from the exhaust sealing segment. In FIGS. 5A and 5B, the exhaust sealing segment is the central portion of the gasket 16 that is shaped to lie on the first surface 22 described above. The coolant sealing segment of the plate 160 comprises the extensions 122. The stainless steel plate 160 forms the overall shape of the gasket 16 with its raised portion 140. It should be understood that the isometric representation of FIG. 5B is intended to show relative positions of the various sections of the gasket structure and it is not intended to represent the precise configuration of the silicone rubber elements. The relative shape and encapsulating configuration of the silicone rubber elements will be described below in greater detail in conjunction with FIGS. 6A and 6B.

As can be seen in FIGS. 5A and 5B, the exhaust sealing segment and the coolant sealing segment each have first and second planar surfaces on opposite sides thereof. One planar surface is on the upper side of the plate 160 while the second planar surface is on the lower side of the plate 160. The first and second planar surfaces of the exhaust sealing segment are co-planar, respectively, with the first and second planar surfaces of the coolant sealing segment. An exhaust opening 141 is formed through the thickness of the exhaust sealing segment of the gasket 16. A first elastomeric seal is shown disposed on the first surface of the coolant sealing segment in FIGS. 5A and 5B. A second elastomeric seal (not visible in FIGS. 5A and 5B) is disposed on the second surface of the coolant sealing segment. The first and second elastomeric seals are integral parts of a common elastomeric element. The raised portion 140 of the exhaust opening 141 extends at an angle from the exhaust sealing segment in a direction away from the first surface, or upper surface, to form a transition segment from a first opening which is co-planar with the first surface to a second opening which is displaced upward from the first surface as a result of the raised portion. Because of the sloping walls of the raised portion 140, the second opening is of a second size which is smaller than the first opening. This basic shape of the raised portion 140 conforms with the shape described in U.S. Pat. No. 5,133, 185 and serves the same purpose.

As illustrated in FIG. 5A, several layers are combined to form the gasket 16 shown in FIG. 5B. The 70 pound per cubic foot coating 170, which is available in commercial quantities from the Ucar Carbon Company under the trademark "GRAFOIL", is rigidly attached to the upper and lower surfaces of the stainless steel plate 160. Additional coatings 180, which are 90 pound per cubic foot coatings and available from the Ucar Carbon Company under the name "GRAFOIL" are attached to the exposed surfaces of the other coatings 170 as represented in FIG. 5A.

FIG. 5B shows the gasket 16 with all of the layers shown in FIG. 5A attached together to form the composite gasket.

The extensions 122 of the gasket 16 can serve two alternative purposes in alternative embodiments of the present invention. In one embodiment, the center portion 124 of the extensions 122 comprise an opening extending through the thickness of the stainless steel plate 160 to allow liquid to flow therethrough. When the central portion 124 comprises this hole, sea or lake water can flow upward from the second openings 34 of the exhaust manifold 10 and through the hole at the central portion 124. From there, the coolant continues its upward flow away from the exhaust manifold 10 and into either the fourth openings 64 of the exhaust elbow 14 directly or through the conduit 108 formed through the member identified by reference numeral 110 in the Figures. Alternatively, the central portion 124 can be solid to provide a closure, or cover, that is disposed over the second openings 34. This embodiment, wherein the central portion 124 is solid, is used in marine propulsion systems that include a closed cooling system. In these embodiments, a coolant such as ethylene glycol is circulated through the engine and through the exhaust manifolds 10, but not through the exhaust elbow 14. Other cooling water, drawn from the body of water in which the marine vessel is operated, is caused to flow into openings 120 and upward through conduit passages 108 to enter the fourth openings 64 of the exhaust elbow 14. The water flowing through the internal coolant passage 60 of the exhaust elbow 14 is then eventually combined with exhaust gases and returned to the body of water in which the marine vessel is operating. Therefore, the central portion 124 of the extensions 122 of the gasket 16 can either be an opening through the thickness of the stainless steel plate 160 or a solid portion of the plate that blocks a flow of liquid therethrough. In either embodiment, a silicone rubber sealing material 190 is adhered to and encapsulated around the thickness of the stainless steel plate 160 in the region of the extensions 120. This provides a seal around openings 34 regardless of whether or not coolant is caused to flow out of the exhaust manifold 10 through opening 34.

FIGS. 6A and 6B illustrate the embodiment of the gasket 16 with the hole 194 extending through the thickness of the plate 160 and the embodiment where the central portion 124 is solid in the central region, respectively. In FIG. 6A, the hole 194 extends through the thickness of the stainless steel plate 160 and has a central axis 196. This hole, 194 provides a passage through which sea or lake water can flow out of the second opening 34 of the exhaust manifold 10 and into the fourth opening 54 of the exhaust elbow 14. The embodiment of the present invention shown in FIG. 6B provides a solid section 198 of the plate 160 in the central region 124. This embodiment blocks flow out of the second opening 34 of the exhaust manifold 10. In both embodiments, shown in FIGS. 6A and 6B, a silicone rubber portion 190 is adhered to and formed around the stainless steel plate 160 in the region of the central portion 124 and on both the first and second surfaces of the exhaust sealing segment.

In FIG. 6A, the silicone rubber is adhesively bonded to plate 160 and also completely encapsulates the outermost portion 199 of the plate 160 at the distal end of the extensions 122. In the embodiment shown in FIG. 6B, where no hole 194 exists, notches 200 are formed through the thickness of the plate 160 to facilitate production of the device and to secure attachment of the silicone rubber seal 190 to the plate 160. An adhesive tie layer also holds the rubber to the plate. In a preferred embodiment, four arcuate notches are punched through the thickness of the plate 160 and spaced around central axis 196 to allow the silicone rubber 190 to flow through the notches 200 during production of the silicone rubber geometry. These notches also serve the purpose of firmly attaching the two seal portions, which exist on both the upper and lower surfaces of the plate 160 to each other. Since a hole 194 exists in the embodiment of FIG. 6A, these notches 200 are not required. The silicone rubber seal 190 can be encapsulated over the internal surface of the hole 194 to firmly join the upper and lower portions of the seal that are formed on the upper and lower surfaces of the plate 160.

In either embodiment of the gasket 16 as shown in FIGS. 6A and 6B, the silicone rubber seal 190 prevents liquid coolant from leaking from the second opening 34 and between the opposed facing second and fourth surfaces of the exhaust manifold 10 and the exhaust elbow 14, respectively. It should also be noted that, in the event of the unlikely leak through the silicone rubber seal 190, liquid coolant can not flow into the exhaust cavity 20 of the exhaust manifold 10 because the leaking water would first flow into a region of atmospheric pressure, including the gap identified by reference numerals 40 and 70 in FIG. 2, prior to passing into the exhaust passage which is defined by the first opening 24 and the third opening 54. The pressure in this exhaust conduit is greater than atmospheric pressure and therefore it is impossible for water to leak into the exhaust passages from the regions between the first and second raised portions, 26 and 36, and between the third and fourth raised portions, 56 and 66. Therefore, the structure of the present invention inhibits any flow of leaking coolant into the internal exhaust cavity 20 of the exhaust manifold 10. As a result, leaking water can not flow toward the exhaust valves of the cylinders to cause potential damage.

The gasket 16 of the present invention provides a device that efficiently seals both the exhaust passage and the coolant passages between the exhaust manifold 10 and the exhaust elbow 14. The gasket 16 is a composite structure, in a preferred embodiment, which comprises several layers as described above in conjunction with FIG. 5A. The raised portion 140 of the plate 160 performs the function of trapping moisture between the surface of the raised portion 140 and the internal wall of the exhaust passage in the exhaust elbow 14. An elastomeric material adheres to and is encapsulated around a portion of the extensions 122 and forms upper and lower seals around the central portion 124 of the gasket 16. As discussed above, alternative embodiments of the present invention either dispose the silicone seal around a hole 194 or around a solid section 198. In embodiments where the central portion 124 is solid, holes are punched through the thickness of the plate 160 to connect the upper and lower seals and form an integral elastomeric member.

The gasket 16, which is illustrated specifically in FIGS. 5A, 5B, 6A, and 6B, is particularly intended for use in conjunction with an exhaust system such as the exhaust system illustrated in FIGS. 1 and 2, without an intermediate spacer member, or the exhaust systems shown in FIGS. 3, 4A, and 4B which incorporate a integral spacer member. Both the structure of the exhaust system, comprising the exhaust manifold 10 and the exhaust elbow 14, and the structure of the gasket 16 are intended to separate the coolant flow and the exhaust flow in the region of the interface between the exhaust manifold 10 and the exhaust elbow 14.

By providing an open space, exposed to atmospheric pressure, between the raised portions associated with the exhaust flow and raised portions associated with the coolant flow, several advantages are achieved. First, the exhaust joint is maintained at a higher temperature than would otherwise be possible. Secondly, leakage of the coolant passage to the exhaust passage is avoided.

Although the present invention has been described with considerable detail and illustrated to show a preferred embodiment, it should be understood that alternative embodiments are also within its scope.

We claim:

1. A gasket for an exhaust system, comprising:
a plate having an exhaust sealing segment and a coolant sealing segment attached to and extending from the exhaust sealing segment, said exhaust sealing segment and said coolant sealing segment each having first and second planar surfaces on opposite sides thereof, said first and second planar surfaces of said exhaust sealing segment being coplanar with said first and second planar surface of said coolant sealing segment, respectively;
an exhaust opening formed through the thickness of said exhaust sealing segment, said exhaust opening being shaped to be alignable with an exhaust passage of the exhaust system;
a first elastomeric seal disposed on said first surface of said coolant sealing segment;
a second elastomeric seal disposed on said second surface of said coolant sealing segment, said first and second elastomeric seals being integral parts of a common elastomeric element;
a raised portion of said exhaust opening extending at an angle from said exhaust sealing segment away from said first surface to form a transition segment from a first opening of a first size which is coplanar with said first surface to a second opening of a second size which is displaced from said first surface, said raised portion being sized to be inserted into said exhaust passage, and
a coolant hole through said plate located at said coolant sealing segment, said coolant hole being aligned with a coolant passage of said exhaust system.

2. The gasket of claim 1, wherein:
said second opening is smaller in area than said first opening.

3. The gasket of claim 1, wherein:
said transition segment is the shape of a frustum of a pyramid.

4. The gasket of claim 1, further comprising:
a hole through said plate located at a central region of said coolant sealing segment.

5. The gasket of claim 4, wherein:
said common elastomeric element extends through said hole, said first and second elastomeric seals being joined to each other within said hole.

6. The gasket of claim 4, wherein:
said hole is circular.

7. The gasket of claim 4, wherein:
said hole is formed in the shape of an arc.

8. The gasket of claim 1, wherein:
said coolant sealing segment is configured to inhibit a flow of liquid through said plate.

9. The gasket of claim 1, wherein:
said elastomeric element is made of silicone rubber.

10. The gasket of claim 1, wherein:
said plate is a metal plate.

11. The gasket of claim 1, wherein:
said plate is made of stainless steel.

12. The gasket of claim 1, further comprising:
a first graphite layer attached to said first surface; and
a second graphite layer attached to said second surface.

13. A gasket for an exhaust system, comprising:
a metal plate having an exhaust sealing segment and a coolant sealing segment attached to and extending from the exhaust sealing segment, said exhaust sealing segment and said coolant sealing segment each having first and second planar surfaces on opposite sides thereof, said first and second planar surfaces of said exhaust sealing segment being coplanar with said first and second planar surface of said coolant sealing segment, respectively,
an exhaust opening formed through the thickness of said exhaust sealing segment, said exhaust opening being shaped to be alignable with an exhaust passage of the exhaust system;

a first elastomeric seal disposed on said first surface of said coolant sealing segment, a second elastomeric seal disposed on said second surface of said coolant sealing segment, said first and second elastomeric seals being integral parts of a common elastomeric element, a raised portion of said exhaust opening extending at an angle from said exhaust sealing segment away from said first surface to form a transition segment from a first opening of a first size which is coplanar with said first surface to a second opening of a second size which is displaced from said first surface, said raised portion being inserted into said exhaust passage, and a coolant hole through said plate located at said coolant sealing segment, said coolant hole being aligned with a coolant passage of said exhaust system.

14. The gasket of claim 13, wherein:

said second opening is smaller in area than said first opening.

15. The gasket of claim 14, wherein:

said transition segment is the shape of a frustum of a pyramid.

16. The gasket of claim 15, further comprising:

a hole through said metal plate located at a central region of said coolant sealing segment, said common elastomeric element extending through said hole, said first and second elastomeric seals being joined to each other within said hole.

17. The gasket of claim 16, wherein:

said hole is formed in the shape of an arc.

18. A gasket for an exhaust system, comprising:

a stainless steel plate having an exhaust sealing segment and a coolant sealing segment attached to and extending from the exhaust sealing segment, said exhaust sealing segment and said coolant sealing segment each having first and second planar surfaces on opposite sides thereof, said first and second planar surfaces of said exhaust sealing segment being coplanar with said first and second planar surface of said coolant sealing segment, respectively;

an exhaust opening formed through the thickness of said exhaust sealing segment, said exhaust opening being shaped to be alignable with an exhaust passage of the exhaust system;

a first elastomeric seal disposed on said first surface of said coolant sealing segment;

a second elastomeric seal disposed on said second surface of said coolant sealing segment, said first and second elastomeric seals being integral parts of a common elastomeric element;

a raised portion of said exhaust opening extending at an angle from said exhaust sealing segment away from said first surface to form a transition segment from a first opening of a first size which is coplanar with said first surface to a second opening of a second size which is displaced from said first surface, said raised portion being inserted into said exhaust passage; and a coolant hole through said plate located at said coolant sealing segment said coolant hole being aligned with a coolant passage of said exhaust system.

19. The gasket of claim 18, further comprising:

a hole through said stainless steel plate located at a central region of said coolant sealing segment, said common elastomeric element extending through said hole, said first and second elastomeric seals being joined to each other within said hole;

a first graphite layer attached to said first surface; and a second graphite layer attached to said second surface.

* * * * *